United States Patent
Ishikawa et al.

(10) Patent No.: US 8,074,489 B2
(45) Date of Patent: Dec. 13, 2011

(54) IMPACT DETECTING APPARATUS AND PACKAGING SYSTEM

(75) Inventors: Sakae Ishikawa, Kanagawa (JP); Rikio Kasahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 186 days.

(21) Appl. No.: 12/385,125

(22) Filed: Mar. 31, 2009

(65) Prior Publication Data

US 2009/0249858 A1    Oct. 8, 2009

(30) Foreign Application Priority Data

Apr. 2, 2008   (JP) ................................. 2008-095711
Sep. 16, 2008  (JP) ................................. 2008-236551

(51) Int. Cl.
  *G01M 7/00*   (2006.01)
  *G01N 3/30*   (2006.01)
(52) U.S. Cl. ..................... 73/12.04; 73/12.05; 73/12.06; 73/12.09; 73/12.13; 116/202
(58) Field of Classification Search ............... 116/200, 116/202, 203, 204, 211, 212, 267, 276; 73/12.01–12.09
  See application file for complete search history.

(56) References Cited

U.S. PATENT DOCUMENTS

| | | | | |
|---|---|---|---|---|
| 3,373,716 A | * | 3/1968 | Williams | 116/203 |
| 3,688,734 A | * | 9/1972 | Davis et al. | 116/215 |
| 3,707,722 A | * | 12/1972 | Itoh | 346/7 |
| 3,835,809 A | * | 9/1974 | Sinn, Jr. | 116/203 |
| 3,909,568 A | * | 9/1975 | Greenhut | 200/61.45 R |
| 4,060,004 A | * | 11/1977 | Scholz et al. | 340/436 |
| 4,068,613 A | * | 1/1978 | Rubey | 116/203 |
| 4,125,085 A | * | 11/1978 | Rubey | 116/203 |
| 4,177,751 A | * | 12/1979 | Rubey | 116/201 |
| 4,237,736 A | * | 12/1980 | Wright | 73/492 |
| 4,361,106 A | * | 11/1982 | Eklof | 116/203 |
| 4,470,302 A | | 9/1984 | Carte | |
| 6,698,272 B1 | | 3/2004 | Almirante | |
| 6,848,389 B1 | * | 2/2005 | Elsasser et al. | 116/203 |

FOREIGN PATENT DOCUMENTS

| | | |
|---|---|---|
| DE | 10000565.9 | 9/2001 |
| JP | 02/34614 | 9/1990 |
| JP | 04-34614 | 9/1990 |
| JP | 04-43266 | 4/1992 |
| JP | 10177035 | 6/1998 |
| JP | 2001-108703 | 4/2001 |
| JP | 2001-199475 | 7/2001 |
| JP | 2003-207515 | 7/2003 |
| JP | 2006-053037 | 2/2006 |

OTHER PUBLICATIONS

European Search Report dated Aug. 3, 2009 issued in the corresponding Application No. EP 09250898.5-1236.
Nippon Kako-Kizai, "Drop Sign," http://www.nk-kizai.co.jp/ENG/news.html, Nov. 26, 2002.

* cited by examiner

*Primary Examiner* — Lisa Caputo
*Assistant Examiner* — Jonathan Dunlap
(74) *Attorney, Agent, or Firm* — Harness, Dickey & Pierce, P.L.C.

(57) ABSTRACT

An impact detection sensor is attached to a packaging container. When the packaging container is subjected to impacts downward in a vertical direction twice, i.e., a bottom surface of the packaging container is subjected to impacts twice, a weight moves downward in the vertical direction by the application of the first impact, and is seen through a weight indicator unit located on the bottom of an impact detection sensor. At the time of the application of the second impact, the weight moved downward in the vertical direction is prevented from moving back to an initial position by a pressing portion, and seen through the same bottom weight indicator unit.

12 Claims, 12 Drawing Sheets

| DIMENSION OF PRODUCT | DIMENSION OF PRODUCT | W: 398 × D: 458 × H: 541 [mm] |
|---|---|---|
| | VOLUME OF PRODUCT | 0.099 [m³] |
| DIMENSION OF PACKAGING | DIMENSION OF PACKAGING | W: 560 × D: 590 × H: 590 [mm] |
| | VOLUME OF PACKAGING | 0.195 [m³] |
| WEIGHT OF PRODUCT | WEIGHT OF PRODUCT | 22.8 [kg] |
| | WEIGHT OF ACCESSORIES | 0 [kg] |
| | STATEMENT OF ACCESSORIES | |
| | GROSS WEIGHT OF PRODUCT | 22.80 [kg] |
| GROSS WEIGHT | PRODUCT + PACKAGING | 29 [kg] |

FIG. 16

| ELASTIC MEMBER / PRESET VALUE | | DROP HEIGHT/DROP VELOCITY | | |
|---|---|---|---|---|
| | | 60cm/3.4m/s | 45cm/3.0m/s | 35cm/2.6m/s |
| AMOUNT OF DISPLACEMENT d | 0.60mm | ○ | × | × |
| | 0.25mm | ○ | ○ | × |
| | 0.05mm | ○ | ○ | ○ |

FIG. 17

| ELASTIC MEMBER / PRESET VALUE | | DROP HEIGHT/DROP VELOCITY | | |
|---|---|---|---|---|
| | | 50cm/3.1m/s | 35cm/2.6m/s | 20cm/2.0m/s |
| THICKNESS t | 0.25mm | ○ | × | × |
| | 0.20mm | ○ | ○ | × |
| | 0.15mm | ○ | ○ | ○ |

FIG. 18

| DETECTION ACCURACY / PRESET VALUE | | DROP HEIGHT/DROP VELOCITY | | | |
|---|---|---|---|---|---|
| | | 50cm/3.1m/s | | 25cm/2.2m/s | |
| | | HELD IN CIRCULAR HOLE | HELD ON SURFACE | HELD IN CIRCULAR HOLE | HELD ON SURFACE |
| DETECTION REACTION SENSITIVITY | 1.5cm OR LESS | × | × | ○ | × |
| | 2.5cm OR LESS | ○ | × | — | × |
| | 5.0cm OR LESS | — | × | — | ○ |
| | 8.0cm OR LESS | — | ○ | — | — |

MOVEMENT OF WEIGHT IN IMPACT DETECTOR →

IMPACT DETECTING APPARATUS AND PACKAGING SYSTEM

CROSS-REFERENCE TO RELATED APPLICATIONS

The present application claims priority to and incorporates by reference the entire contents of Japanese priority document 2008-095711 filed in Japan on Apr. 2, 2008 and Japanese priority document 2008-236551 filed in Japan on Sep. 16, 2008.

BACKGROUND OF THE INVENTION

1. Field of the Invention

The present invention relates to technology for detecting whether precision equipment is subjected to an impact while it was being transported.

2. Description of the Related Art

When goods such as precision equipment are shipped, the goods may be damaged depending on the handling conditions. If a magnitude of impact on the goods does not exceed a damage boundary, by taking damage-preventive measures based on a prior damage evaluation by a packaging condition, it is possible to prevent the goods from being damaged.

For example, Japanese Patent Application Laid-open No. 2001-108703 discloses an impact detection display member that can be attached to a packaging good. The impact detection display member includes a weight having a smooth surface capable of reflecting an incident light and a beam supporting the weight. When the packaging good to which the impact detection display member is attached is subjected to an impact, for example, by being dropped, the impact detection display member detects the impact because the weight is inclined. Therefore, people can visually confirm whether the packaging good was subjected to an impact based on whether the weight is inclined. However, this technology is disadvantageous in that the impact detection display member has a complicated structure and has difficulty detecting an impact in both a longitudinal direction and a lateral direction. The same goes for a technology disclosed in Japanese Patent Application Laid-open No. 2001-199475.

NIPPON KAKO-KIZAI CO., LTD. has manufactured and marketed an impact detector "DROP SIGN". The impact detector is, as shown in FIGS. 19A and 19B, composed of a front case 11, a rear case 12, a leaf spring 13, a leaf-spring fixation portion 14, a guide plate 15, a colored weight 16, and upper and lower window holes 17. The impact detector is attached to an object subject to impact detection in a state where a long side of which is oriented in a longitudinal direction so as to detect a longitudinal impact. Specifically, while the object is not subjected to any impact, the weight 16 is held in the middle of the case by the leaf spring 13. When the object is subjected to a longitudinal impact, the weight 16 moves either upward or downward across the leaf spring 13. For example, when the weight 16 moves downward, the color of the weight 16 can be seen through the lower window hole 17. Therefore, people can visually confirm the downward movement of the weight 16, i.e., can recognize that the object is subjected to the impact. However, in this configuration, when the object is dropped and subjected to a longitudinal impact, the weight 16 moves downward across the leaf spring 13 with bending the leaf spring 13 downward by force. In other words, the weight 16 is configured to move in one axial direction only. Therefore, the impact detector can detect the longitudinal impact but cannot detect whether the object is overturned (fallen) on its side. Alternatively, if the impact detector is attached to the object in a state where the long side of which is oriented in a lateral direction, the impact detector can detect a lateral impact, i.e., whether the object is overturned (fallen) on its side, but cannot detect a longitudinal impact. This means the impact detector can detect either a longitudinal impact or a lateral impact only. Therefore, to detect both a longitudinal impact and a lateral impact, it is necessary to attach two impact detectors to the object in different orientations.

Moreover, in an impact detector as disclosed in Japanese Patent Application Laid-open No. 2003-207515, Japanese Patent Application Laid-open No. 2006-53073, Utility Model Application Laid-open No. H04-43266, and Utility Model Application Laid-open No. H04-34614, a spherical weight is supported on a relatively large face of an elastic member. When an object to which the impact detector is attached is subjected to an impact, the weight moves to be exposed, which means that the object is subjected to the impact.

However, even with the above conventional technologies, it is still difficult to prevent goods from being damaged completely if the goods are subjected to a greater-than-expected magnitude of impact, for example, by being dropped or fallen accidentally or handled roughly by a carrier.

When a packaging of goods is significantly damaged by an impact, it is possible to find the damage on the goods at the time of inspection of the goods before the goods are delivered to a customer or a shop. However, there is a possibility that only the goods are damaged even though the packaging is not apparently damaged. In this case, the damage on the goods is found after the goods are delivered to the customer or the shop, which results in a complaint and erosion of customer's trust.

SUMMARY OF THE INVENTION

It is an object of the present invention to at least partially solve the problems in the conventional technology.

According to an aspect of the present invention, there is provided an impact detecting apparatus including an indicator unit capable of indicating a direction of an impact when the impact detecting apparatus is subjected to the impact. When the impact detecting apparatus is subjected to multiple impacts in different directions, the indicator unit is capable of indicating the directions all together.

According to another aspect of the present invention, there is provided a packaging system including a packaging container for packing therein an object to be packaged, the packaging container having at least one surface; and the above impact detecting apparatus attached to the surface of the packaging container.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a table depicting a result of a drop test with respect to different amounts of displacement of an elastic member (a spring);

FIG. 17 is a table depicting a result of a drop test with respect to different thicknesses of the elastic member (the spring);

FIG. 18 is a table depicting a result of a drop test with respect to different methods of holding weights in the elastic member (the spring);

DETAILED DESCRIPTION OF THE PREFERRED EMBODIMENTS

Exemplary embodiments of the present invention are explained in detail below with reference to the accompanying drawings.

An impact detection sensor according to a first embodiment of the present invention includes a casing 1, four movable weights 20, an elastic member 30, and a cover 50. The weights 20 are movably put on the casing 1 (see FIGS. 2A and 2B). The elastic member 30 restricts the movement of the weights 20 (see FIGS. 3, 4A and 4B). The casing 1 is covered with the cover 50 (see FIG. 5).

Figure 1A:
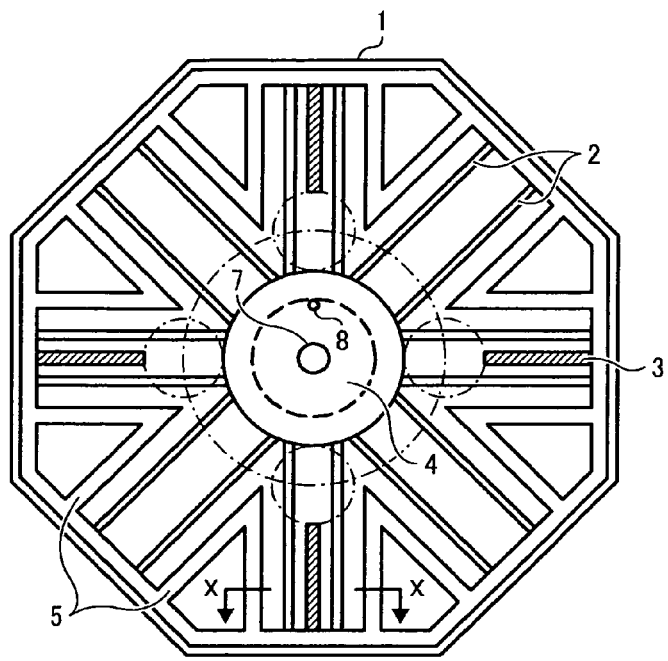
FIG. 1A is a front view of a casing of an impact detection sensor according to a first embodiment of the present invention.
Figure 1B:
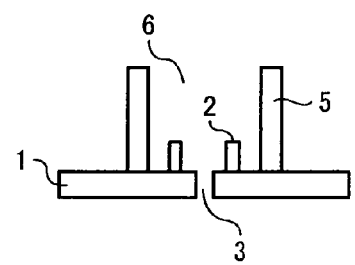
FIG. 1B is a cross-sectional view of the casing along the line x-x shown in FIG. 1A.

First, a configuration of the casing 1 is explained below with reference to FIGS. 1A and 1B. FIG. 1A is a front view of the casing 1. FIG. 1B is a cross-sectional view of the casing 1 along the line x-x shown in FIG. 1A. The casing 1 includes a round table-like convex portion 4 (see FIG. 4A). Pairs of ribs 2 extending from an outer side surface of the convex portion 4 to a circumference of the casing 1 are radially formed on the casing 1. Each pair of the ribs 2 serves as guide rails for lowering a sliding resistance to the weight 20 while the weight 20 is moving. Incidentally, in the present embodiment, eight pairs of the ribs 2 are radially formed, so that the impact detection sensor can detect any of impacts in eight directions, i.e., up, down, left, right, and four diagonals.

On the outer sides of each pair of the ribs 2, i.e., on the sides where the ribs 2 are not faced to each other, side walls 5 higher than the ribs 2 are provided. An internal space 6 formed between each pair of the ribs 2 and between each pair of the side walls 5 is used as a passage of the weight 20 when the weight 20 moves. Incidentally, the side walls 5 are radially arranged in parallel to the outer sides of each pair of the ribs 2, so that the casing 1 has a high-intensity rib structure.

A reset hole 3 for resetting the weight 20 to an initial position is formed on each of the passages of the weights 20. An elastic-member positioning projection 7 for positioning the elastic member 30 is provided on the center of the convex portion 4. An elastic-member anti-rotation projection 8 for restricting rotation of the elastic member 30 is provided on a circumference of the convex portion 4.

The casing 1, the ribs 2, the convex portion 4, the side walls 5, the elastic-member positioning projection 7, and the elastic-member anti-rotation projection 8 are preferably, but not limited to, made of plastic and molded in an integrated manner.

Figure 2A:
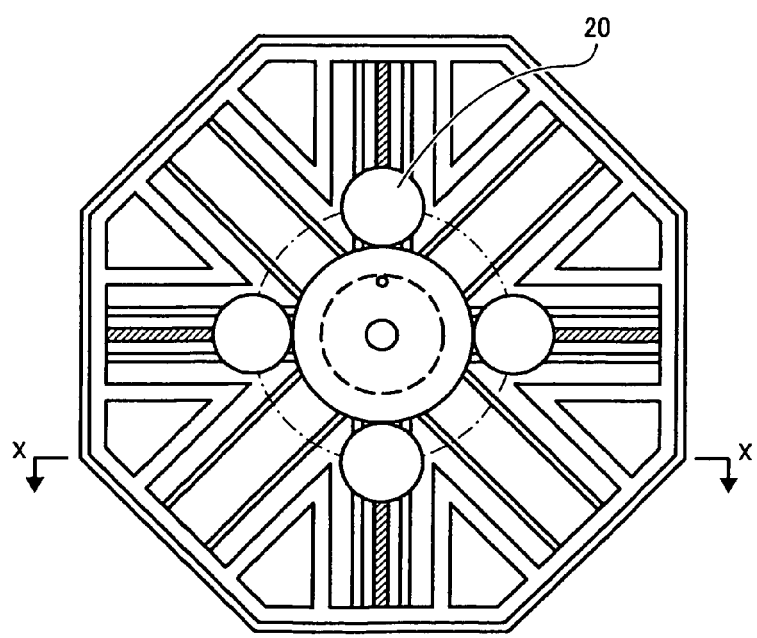
FIG. 2A is a front view of the casing on which weights are movably put.
Figure 2B:
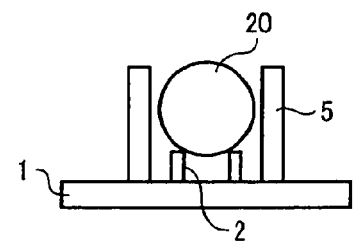
FIG. 2B is a cross-sectional view of the casing and the weight along the line x-x shown in FIG. 2A.

Subsequently, a relation between the casing 1 and the weights 20 is explained below with reference to FIGS. 2A and 2B. FIG. 2A is a front view illustrating a state where the four weights 20 are put on the casing 1 shown in FIG. 1A (on the upper, lower, right, and left sides of the casing 1, respectively). FIG. 2B is a cross-sectional view of the casing 1 and the weight 20 along the line x-x shown in FIG. 2A.

The weight 20 has a spherical shape, and moves within the space 6 while being guided on top end surfaces of the pair of the ribs 2. Inner sides of the pair of the ribs 2 extend straight, and outer sides of the pair of the ribs 2 extend outwardly at a draft angle. Therefore, it is possible to prevent the weight 20 from getting stuck between the ribs 2. The weight 20 is in two-point contact with the top end surfaces of the pair of the ribs 2. Therefore, it is possible to lower the sliding resistance of the weight 20 against the ribs 2. Consequently, it is possible to minimize the adverse effect on the detection performance (control).

Figure 3:
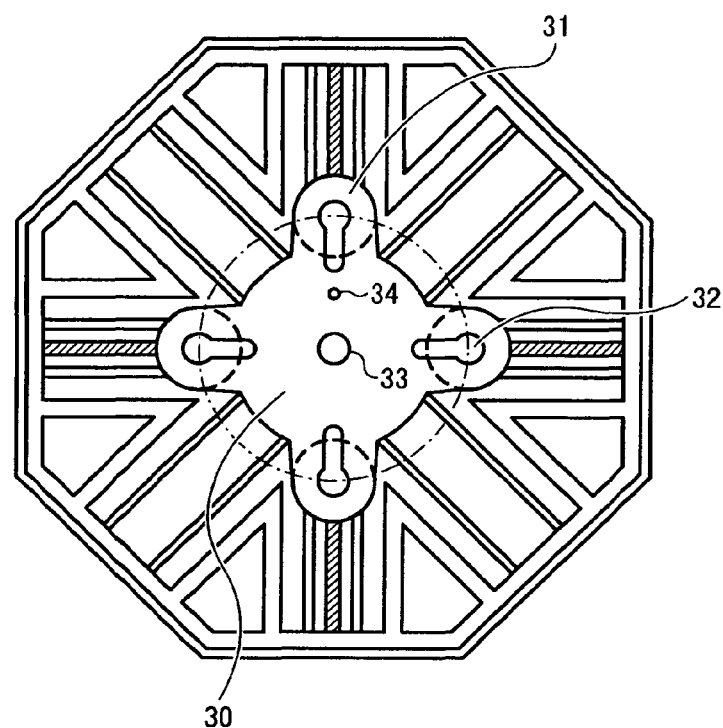
FIG. 3 is a front view illustrating an elastic member attached to the casing shown in FIG. 2A.
Figure 4A:
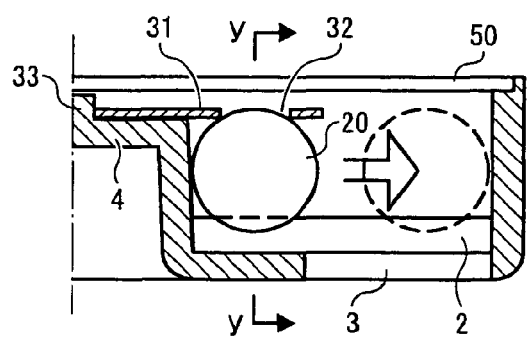
FIGS. 4A and 4B are cross-sectional views of a portion of the impact detection sensor according to the first embodiment for explaining an internal configuration.
Figure 4B:
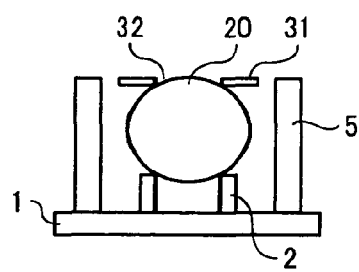

Subsequently, a relation between the elastic member 30 and the weights 20 is explained below with reference to FIGS. 3, 4A, and 4B. FIG. 3 is a front view illustrating a state where the elastic member 30 is attached to that is shown in FIG. 2A. FIGS. 4A and 4B are cross-sectional views of a portion of the impact detection sensor for explaining the passage of the weight 20 (extending from the center to the circumference of the casing 1). Incidentally, in this example shown in FIGS. 3, 4A, and 4B, the elastic member 30 is configured to hold the four weights 20 put in four directions, i.e., up, down, left, and right.

The elastic member 30 is composed of a base portion and four reed-shaped pressing portions 31. The base portion covers the convex portion 4. The pressing portions 31 extend from the base portion along the passages of the weights 20, and bias the weights 20, respectively. A fitting hole 32 in which an upper portion of the weight 20 is fitted is formed on each of the pressing portions 31. The elastic member 30 is preferably made of a thin leaf spring (for example, the one having a thickness of 0.1 mm to reduce a spring constant). Alternatively, the elastic member 30 can be made of the one that a-plurality of leaf springs are superposed on one another to maintain a pressing force or a holding force applied to the weights 20 accurately (i.e., to control attachment/removal). Furthermore, an adjusting means can be provided to the elastic member 30. For example, the elastic member 30 can be attached to a screw, and the screw is installed in the convex portion 4 so as to adjust the biasing force.

A positioning hole 33 is formed on the center of the elastic member 30. The elastic-member positioning projection 7 provided on the center of the convex portion 4 of the casing 1 is fitted in the positioning hole 33. Furthermore, an anti-rotation hole 34 is formed on the elastic member 30. The elastic-member anti-rotation projection 8 provided on the circumference of the convex portion 4 is fitted in the anti-rotation hole 34, and thereby preventing the elastic member 30 from rotating with respect to the convex portion 4. When the elastic member 30 is attached to the convex portion 4 by the engagement of these projections and holes, as shown in FIGS. 4A and 4B, the weights 20 are positioned and held by the application of a predetermined holding force by the pressing portions 31 as free ends of the elastic member 30, the fitting holes 32, and the ribs 2.

By such a configuration, the weights 20 are initially held at positions as indicated by a solid line shown in FIG. 4A and as shown in FIG. 4B by the pressing portions 31 and the ribs 2. When the impact detection sensor is subjected to an impact in a direction of an arrow shown in FIG. 4A, the weight 20 moves in the direction of the arrow (i.e., to a position as indicated by a dashed line shown in FIG. 4A) against the biasing force of the pressing portion 31. The pressing portions 31 independently act on the corresponding weight 20. However, the pressing portions 31 are integrated into the elastic member 30 as one component, and thereby reducing the number of components and a cost.

To put the weight 20 back to the initial position, for example, in assembling or after use of the impact detection sensor, a rod-like member is inserted into the reset hole 3 from below, and slid towards the convex portion 4 (i.e., to the left, in a case shown in FIG. 4A). Alternatively, as the reset hole 3, a circular pinhole can be formed on an end wall surface of the casing 1 as a dead end of the passage where the moved weight 20 is stopped. A needle-like bar is inserted into the pinhole to push the weight 20 back to the initial position.

Figure 5:
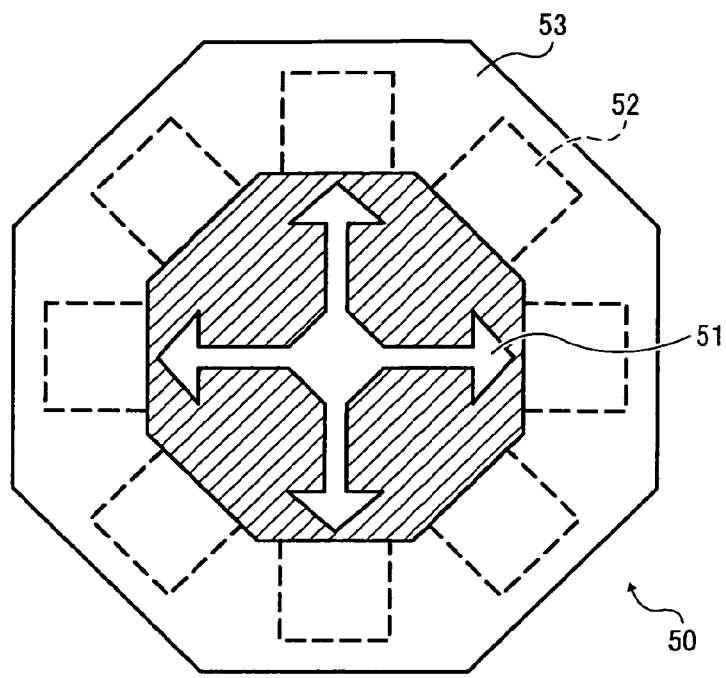
FIG. 5 is a front view of the impact detection sensor according to the first embodiment that a cover is attached to the casing shown in FIG. 3.

Subsequently, a configuration of the cover 50 is explained below with reference to FIG. 5. The cover 50 is provided to cover the top of the casing 1. As shown in FIG. 4A, the cover 50 is arranged to keep a predetermined distance from the elastic member 30. The cover 50 is made of preferably, but not limited to, plastic as the casing 1 is. The cover 50 includes a direction indicator unit 51 and an outer frame unit 53. The direction indicator unit 51 is provided in the center of the cover 50, and indicates a moving direction of each of the weights 20. The outer frame unit 53 is provided to encircle a circumference of the direction indicator unit 51. Eight weight indicator units 52 are provided on the outer frame unit 53. For example, the weight indicator units 52 are a transparent cover so that any movements of the weights 20 can be seen through the weight indicator units 52. The direction indicator unit 51 is covered with a masking material or a nontransparent adhesive film so that inside the direction indicator unit 51 cannot be seen therethrough.

When the weight 20 moves out of the elastic member 30 to the weight indicator unit 52, the weight 20 can be seen through the weight indicator unit 52. To improve the visibility, the weights 20 are painted in easily-noticeable vivid color in contrast to wall color of the casing 1. For example, the weights 20 can be painted in silver (for example, by nickel plating) with respect to a matte-black Mo-base. It goes without saying that the weights 20 can be painted in any other colors or made of materials in easily-noticeable colors to avoid painting the weights 20.

As described above, in the impact detection sensor according to the first embodiment, as the weight indicator units 52, a transparent cover is used. However, the present invention is not limited to the transparent cover. For example, instead of the transparent cover, an open window can be provided on the cover 50 as the weight indicator units 52. The open window has a size smaller than the weight 20 to prevent the weight 20 from coming out from the open window.

Subsequently, an example of how to attach an impact detection sensor 70 according to a second embodiment of the present invention to a packaging container is explained below with reference to FIGS. 6, 7A, and 7B. FIG. 7 depicts a packaging system that includes a packaging container 79 and the impact detection sensor 70. The portions identical to those for the first embodiment are denoted with the same reference numerals, and the description of those portions is omitted.

The impact detection sensor 70 can be directly attached to a side surface of a packaging container 79. However, in the present embodiment, as shown in FIG. 7A, a concave portion 71 is provided in the side wall of the packaging container 79, and the impact detection sensor 70 is embedded in the concave portion 71. The concave portion 71 has preferably a depth equal to or larger than a height of the impact detection sensor 70 so that a surface of the impact detection sensor 70 does not protrude from the side surface of the packaging container 79. However, according to the circumstances, the surface of the impact detection sensor 70 can protrude from the side surface of the packaging container 79.

Figure 6:
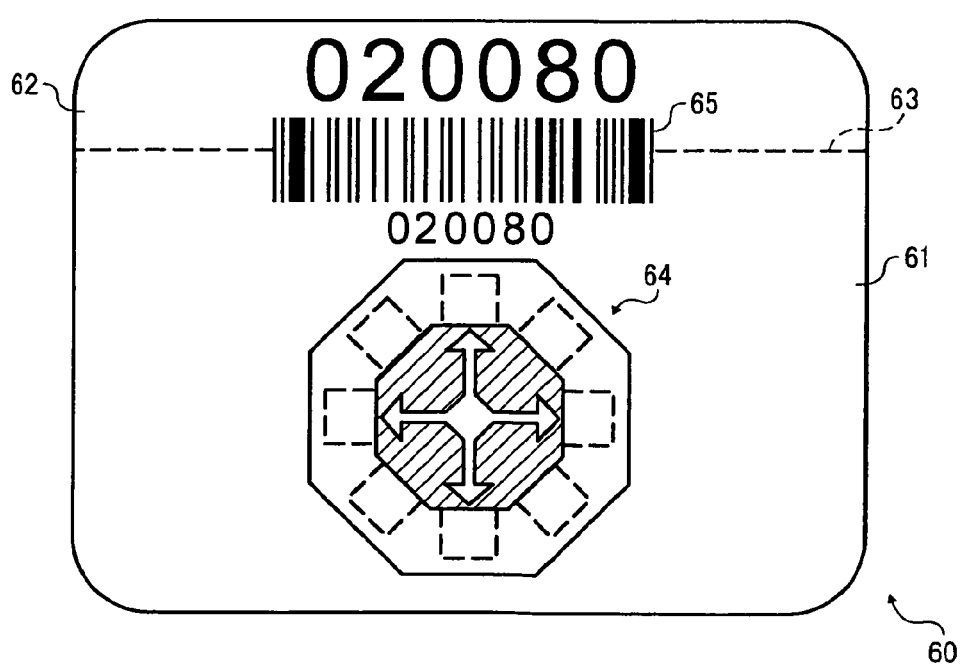
FIG. 6 is a front view of an example of a label attached to a packaging container over an impact detection sensor according to a second embodiment of the present invention.
Figure 7A:
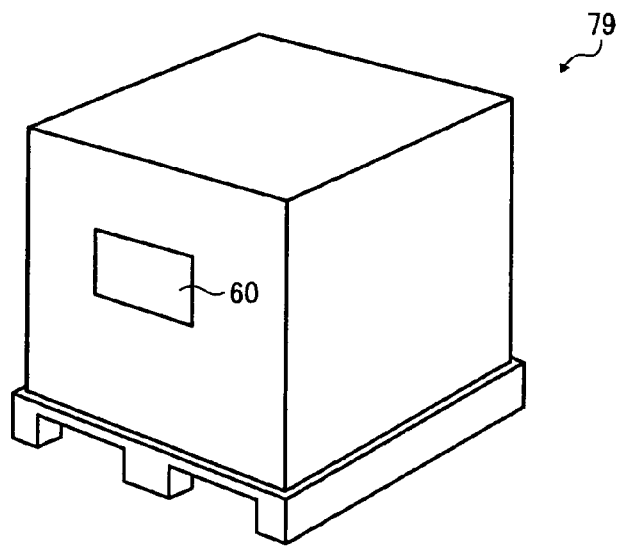
FIG. 7A is a perspective view of a packaging system including the packaging container and the impact detection sensor.
Figure 7B:
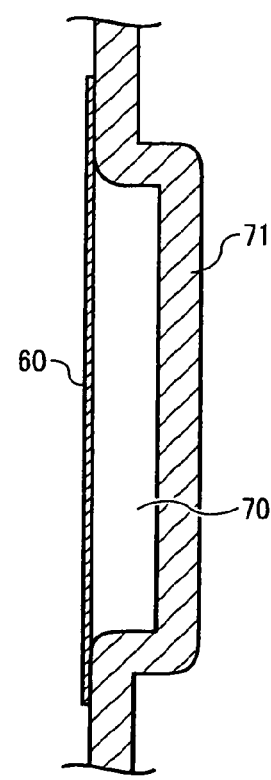
FIG. 7B is an enlarged cross-sectional view of the packaging container shown in FIG. 7A.

FIG. 6 is a schematic diagram of an example of a label 60 attached to the packaging container 79. The label 60 is attached, or stick, to the side wall of the packaging container 79 and over a portion where the impact detection sensor 70 is embedded so that the impact detection sensor 70 does not come off the concave portion 71. As shown in FIG. 6, the label 60 is composed of a lower label portion 61 and an upper label portion 62. The lower label portion 61 covers the impact detection sensor 70. A serial number assigned to an object packaged in the-packaging container 79 to be shipped is listed on the upper label portion 62. In this example, the label 60 includes the lower label portion 61 and the upper label portion 62 in an integrated manner (however, it is not limited to this configuration). The lower label portion 61 can be peeled off along a perforation 63. A bar code 65 including information on the object is printed on the label 60 so as to straddle the upper and lower label portions 62 and 61.

In this manner, in the second embodiment, the impact detection sensor 70 is embedded in the concave portion 71 in the side wall of the packaging container 79, and the label 60 is attached over the impact detection sensor 70. Therefore, it is possible to prevent the impact detection sensor 70 from coming off while the packaging container 79 is shipped (for example, when the packaging container 79 is loaded or unloaded).

Furthermore, even if the lower label portion 61 is peeled off along the perforation 63, the bar code 65 can still be read. Therefore, for example, when a defect arises (i.e., an impact on the packaging container 79 is detected), the packaging container 79 can be stored with the lower label portion 61 peeled off to indicate the defect with keeping bar-code label information (such as an equipment identification number or loading and unloading information). In other words, by removal of the lower label portion 61 from the packaging container 79, association between product management and the defect can be managed by the upper label portion 62.

Subsequently, indication statuses of the impact detection sensor 70 are explained below with reference to FIG. 8.

Figure 8:
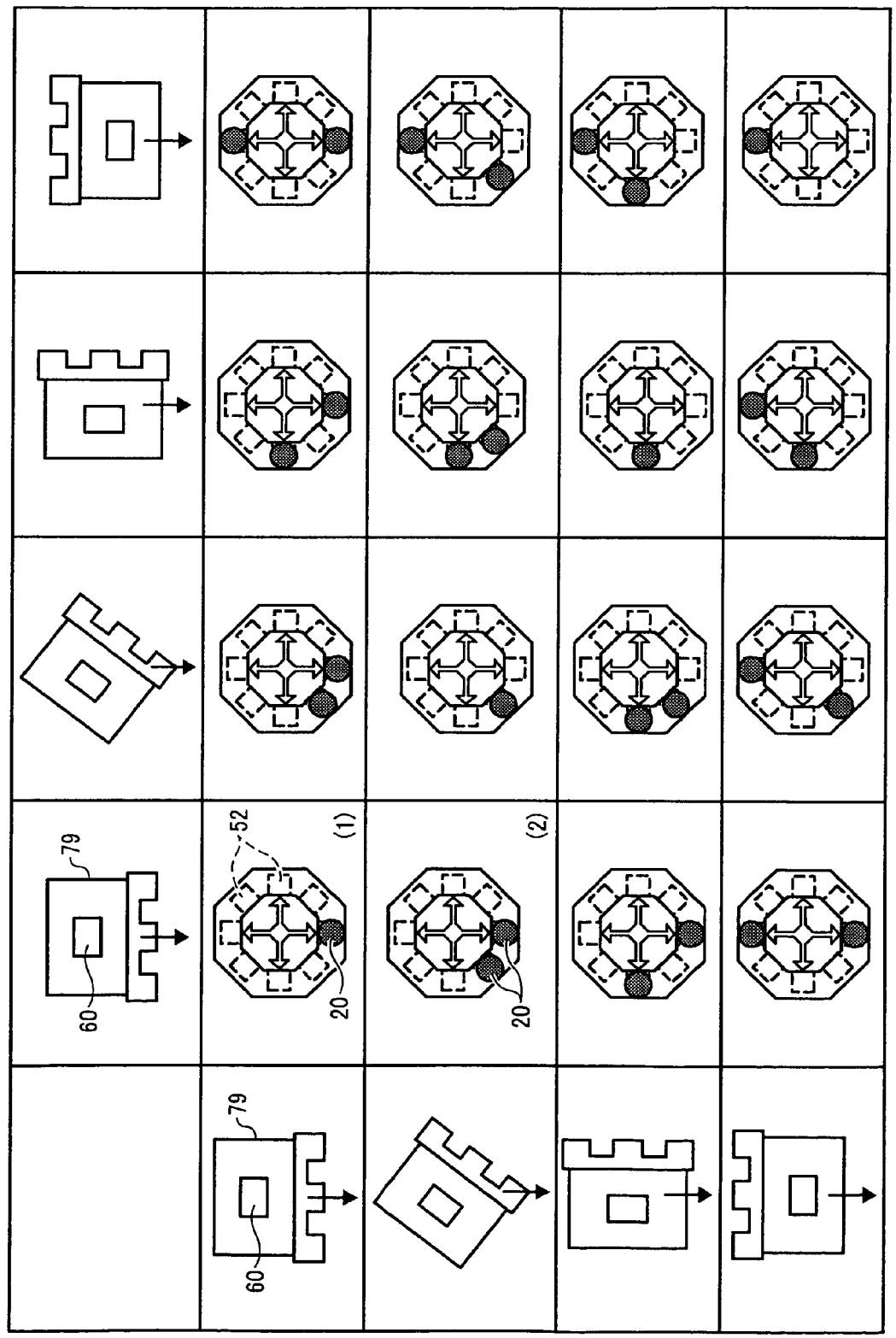
FIG. 8 is a table for explaining indication statuses of the impact detection sensor according to the second embodiment.

FIG. 8 is a table for explaining indication statuses of the impact detection sensor 70 depending on directions of impacts applied to the packaging container 79 (as indicated by arrows shown in FIG. 8). A black circle in the impact detection sensor 70 denotes the moved weight 20 seen through the weight indicator unit 52. Incidentally, in this example, the impact detection sensor 70 is attached to one of the four side walls of the substantially cubic (or substantially rectangular solid) packaging container 79. Alternatively, in view of the shape of the packaging container 79, a direction of impact, and the like, the impact detection sensor 70 can be attached to a surface other than the side walls, or a plurality of the impact detection sensors 70 can be attached to a plurality of surfaces of the packaging container 79.

For example, a case (1) in the table shown in FIG. 8 indicates a status where the packaging container 79 has been subjected to impacts downward in a vertical direction twice assuming that the packaging container 79 is placed properly right side up. In this case, when the packaging container 79 is first subjected to the impact downward in the vertical direction, i.e., the bottom surface of the packaging container 79 is subjected to the impact, the weight 20 moves downward in the vertical direction thereby being seen through the bottom weight indicator unit 52. After that, when the bottom surface of the packaging container 79 is again subjected to the impact, the weight 20 moved downward in the vertical direction by the first impact stays in the same place because the weight 20 is prevented from moving back to the initial position, i.e., upward in the vertical direction by the pressing portion 31 of the elastic member 30.

Furthermore, a case (2) in the table shown in FIG. 8 indicates a status where the packaging container 79 has been subjected to impacts respectively downward in a vertical direction and a lower left direction assuming that the packaging container 79 is placed properly right side up. In this case, when the packaging container 79 is first subjected to the impact downward in the vertical direction, i.e., the bottom surface of the packaging container 79 is subjected to the impact, the weight 20 moves downward in the vertical direction thereby being seen through the bottom weight indicator unit 52. After that, when the packaging container 79 is subjected to the impact in the lower left direction, i.e., a lower left corner of the packaging container 79 is subjected to the impact, the weight 20 moved downward in the vertical direction by the first impact stays in the same place, and the other weight 20 moves in the lower left direction thereby being seen through the lower-left weight indicator unit 52. In this manner, even when a packaging container is subjected to multiple impacts in different directions, the impact detection sensor according to the present invention can indicate a plurality of directions of the multiple impacts all together.

Figure 9A:
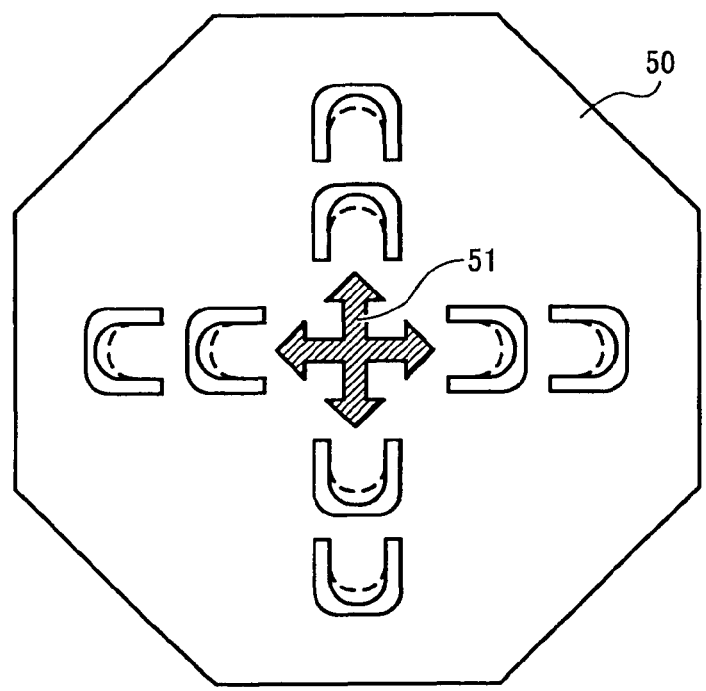
FIG. 9A is a front view of an impact detection sensor according to a third embodiment of the present invention.
Figure 9B:
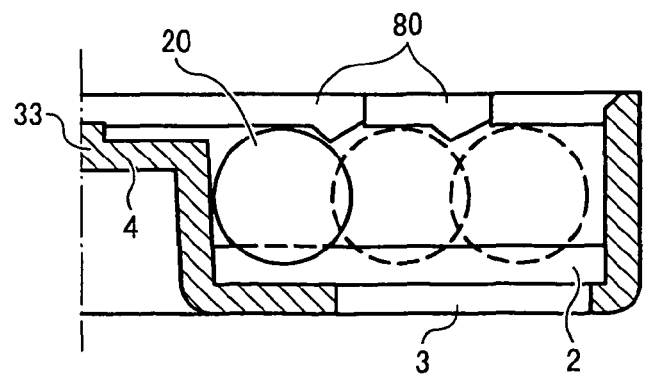
FIG. 9B is a cross-sectional view of a portion of the impact detection sensor shown in FIG. 9A.

FIGS. 9A and 9B are schematic diagrams of an impact detection sensor according to a third embodiment of the present invention. The portions identical to those for the first embodiment are denoted with the same reference numerals, and the description of those portions is omitted.

In the first embodiment, the cover 50 and the elastic member 30 are separate components. In the third embodiment, the elastic member 30 is integrally formed on the cover 50. In other words, the cover 50 includes a function of the elastic member 30. Furthermore, pressing portions 80 (corresponding to the pressing portions 31 in the first embodiment) are also integrally formed on the cover 50. The pressing portions 80 have a wedge shape, and an upstream side of which in a moving direction of the weight 20 is getting wider, i.e., a downstream side of which in the moving direction of the weight 20 is getting narrower. A plurality of the wedge-shaped pressing portions 80 are provided in each of the moving directions of the weights 20. The pressing portions 80 independently bias the corresponding weight 20.

By such a configuration, in an initial state, movements of the weights 20 are restricted by the wedge-shaped pressing portions 80, and also the weights 20 are held by an elastic force of the cover 50. When a packaging container is subjected to a predetermined magnitude of impact, the pressing portions 80 are elastically deformed, and the weight 20 is released from the elastic force of the cover 50 thereby moving in a downstream direction. In this state, if the packaging container is again subjected to a predetermined magnitude of impact in the same direction, the weight 20 moved in the downstream direction by the first impact is restricted in its backward movement, i.e., movement in an upstream direction by the pressing portion 80 because of its wedge shape. Therefore, when a packaging container is subjected to multiple impacts in the same direction, the impact detection sensor according to the third embodiment can indicate the number of times of the impacts.

Figure 10:
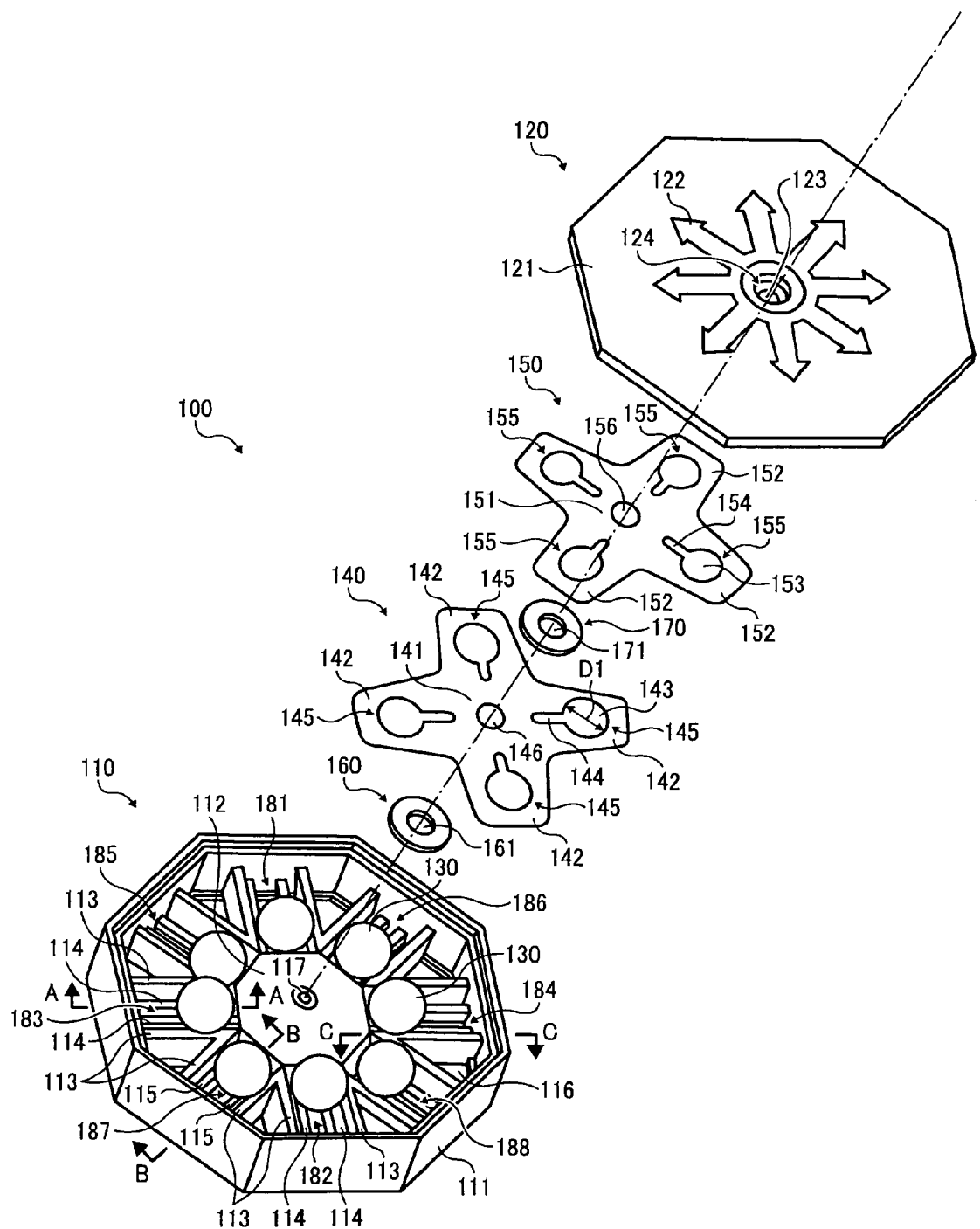
FIG. 10 is an exploded perspective view of an impact detection sensor according to a fourth embodiment of the present invention.
Figure 11A:
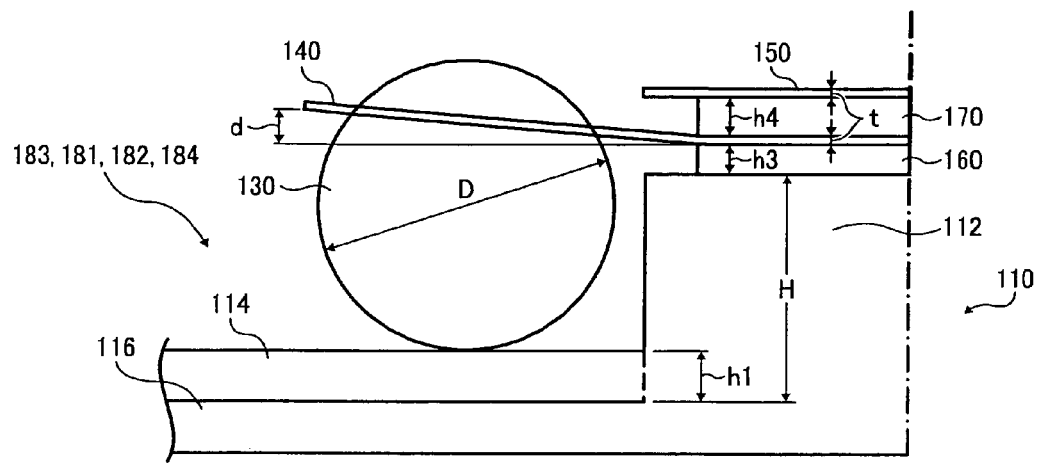
FIG. 11A is a cross-sectional view of the impact detection sensor along the line A-A shown in FIG. 10.
Figure 11B:
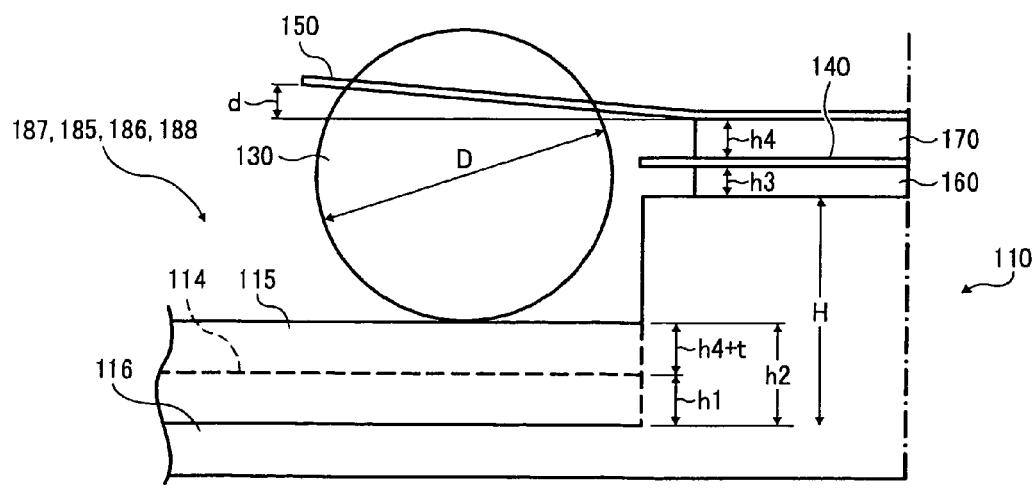
FIG. 11B is a cross-sectional view of the impact detection sensor along the line B-B shown in FIG. 10.
Figure 12A:
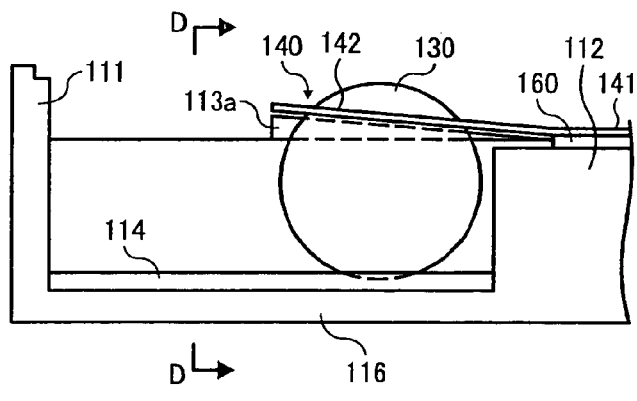
FIG. 12A is a cross-sectional view of the impact detection sensor along the line C-C shown in FIG. 10.
Figure 12B:
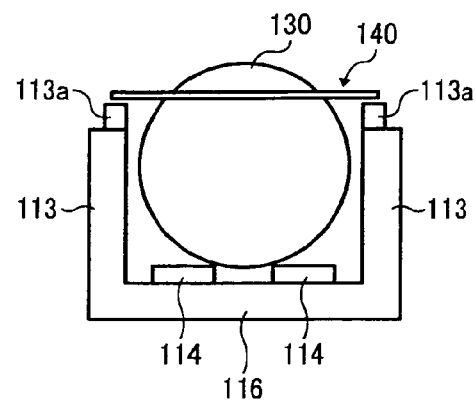
FIG. 12B is a cross-sectional view of the impact detection sensor along the line D-D shown in FIG. 12A.

Subsequently, an impact detection sensor 100 according to a fourth embodiment of the present invention is explained below. FIG. 10 is an exploded perspective view of the impact detection sensor 100. FIGS. 11A and 11B are schematic diagrams illustrating how weights are held by elastic members. FIG. 11A is a cross-sectional view of the impact detection sensor 100 along the line A-A shown in FIG. 10. FIG. 11B is a cross-sectional view of the impact detection sensor 100 along the line B-B shown in FIG. 10. FIGS. 12A and 12B are schematic diagrams illustrating a state where a position of the weight is controlled by the elastic member. FIG. 12A is a cross-sectional view of the impact detection sensor 100 along the line C-C shown in FIG. 10. FIG. 12B is a cross-sectional view of the impact detection sensor along the line D-D shown in FIG. 12A.

The impact detection sensor 100 includes a casing 110, a cover member 120, eight weights 130, a first elastic member 140, a first spacer 160, a second elastic member 150, a second spacer 170, and a screw member (not shown). The cover member 120 is attached to the casing 110. The weights 130 are arranged between the casing 110 and the cover member 120. The first elastic member 140 holds four out of the eight weights 130. The first spacer 160 is arranged between the casing 110 and the first elastic member 140. The second elastic member 150 holds the rest of the weights 130, i.e., the other four weights 130. The second spacer 170 is arranged between the second elastic member 150 and the first elastic member 140. The screw member penetrates through the casing 110, the cover member 120, the first elastic member 140, the second elastic member 150, and the first and second spacers 160 and 170 to bind them.

The casing 110 is composed of a regular-octagonal bottom plate 116 and eight side walls 111. A tabular center base portion 112 is formed in the center of the casing 110. A threaded screw hole 117 for installation of the screw member is formed on the center of the center base portion 112. Furthermore, sixteen erect portions 113 (eight pairs of erect portions 113), extending from the center base portion 112 to the side walls 111, are radially provided on the bottom plate 116 at intervals of 45 degrees between them. The erect portions 113 in pairs form eight guide units 181 to 188 on which the eight weights 130 are put and move thereon when being subjected to an impact. The guide units 181 to 188 are arranged so that when the impact detection sensor 100 is attached to a packaging subject to impact detection, the guide units 181 to 188 are oriented in eight directions, i.e., in upper, lower, left, right, upper left, upper right, lower left, and lower right directions, respectively.

The cover member 120 is an opaque regular-octagonal plate member made of, for example, plastic. A transparent eight-headed arrow portion 122 is provided in the center of the cover member 120 so that the radially-arranged guide units 181 to 188 can be seen through the transparent eight-headed arrow portion 122. Namely, the cover member 120 is opaque except for the eight-headed arrow portion 122. Furthermore, a convex portion 124 projecting into the rear side of the cover member 120 is provided in the center of the cover member 120, i.e., in the center of the eight-headed arrow portion 122. The convex portion 124 presses the front side of the second elastic member 150. A through-hole 123 that the screw member penetrates therethrough is formed on the center of the convex portion 124.

The weights 130 are spheres made of steel, and have a diameter D (see FIGS. 11A and 11B). The weights 130 are chromed to protect against rust.

The first elastic member 140 is a thin sheet made of spring steel having a thickness t (see FIG. 11A). The first elastic member 140 includes a mounting base portion 141 and four projecting portions 142. The mounting base portion 141 is mounted on the center base portion 112 via the first spacer 160. The projecting portions 142 are radially arranged along the guide units 181 to 184. A holding hole 145 for holding the weight 130 is formed on each of the projecting portions 142. The holding hole 145 is composed of a circular hole portion 143 having a diameter D1 (see FIG. 10) and a long hole portion 144. The circular hole portion 143 comes in line contact with a circumferential surface of the weight 130. The long hole portion 144 is provided for adjusting an elastic force of the projecting portion 142. Furthermore, a through-hole 146 that the screw member penetrates therethrough is formed on the center of the mounting base portion 141.

The second elastic member 150 has the same size and shape as the first elastic member 140. The second elastic member 150 is arranged on top of the first elastic member 140 to have a phase difference of 45 degrees from the first elastic member 140. The second elastic member 150 is a thin sheet made of spring steel having the thickness t (see FIG. 11A). The second elastic member 150 includes a mounting base portion 151 and four projecting portions 152. The mounting base portion 151 is mounted on the center base portion 112 via the second spacer 170, the first elastic member 140 and the first spacer 160. The projecting portions 152 are radially arranged along the guide units 185 to 188. A holding hole 155 for holding the weight 130 is formed on each of the projecting portions 152. The holding hole 155 is composed of a circular hole portion 153 having the diameter D1 and a long hole portion 154. The circular hole portion 153 comes in line contact with a circumferential surface of the weight 130. The long hole portion 154 is provided for adjusting an elastic force of the projecting portion 152. Furthermore, a through-hole 156 that the screw member penetrates therethrough is formed on the center of the mounting base portion 151.

The first spacer 160 is a disk-shaped member made of hard rubber having a predetermined thickness h3 (see FIGS. 11A and 11B). A through-hole 161 that the screw member penetrates therethrough is formed on the center of the first spacer 160. Similarly, the second spacer 170 is a disk-shaped member made of hard rubber having a predetermined thickness h4 (see FIGS. 11A and 11B). A through-hole 171 that the screw member penetrates therethrough is formed on the center of the second spacer 170.

In this example, a pair of guide rails 114 for guiding the weight 130 is provided on the inner side of each pair of the guide units 181 to 184, and a pair of guide rails 115 for guiding the weight 130 is provided on the inner side of each pair of the guide units 185 to 188. A portion of an upper surface of the bottom plate 116 corresponding to areas between each pair of the guide rails 114 and areas between each pair of the guide rails 115 is painted, for example, in red.

Four of the weights 130 are put on the guide units 181 to 184 extending in the upper, lower, left, and right directions respectively. The first elastic member 140 holds the four weights 130 in normal positions, i.e., positions where the weights 130 are located before the packaging is not subjected to any impact. The other four weights 130 are put on the guide units 185 to 188 extending in the upper left, upper right, lower left, and lower right directions respectively. The second elastic member 150 holds the four weights 130 in normal positions.

At this time, the second spacer 170 is arranged between the first elastic member 140 and the second elastic member 150, so that an installation height of the first elastic member 140 from the center base portion 112 is h3, and an installation height of the second elastic member 150 from the center base portion 112 is h3+t+h4.

In this example, to equalize the holding forces of the first and second elastic members 140 and 150 for holding the weights 130, a height h2 (h2=h1+h4+t) of the guide rails 115 provided in the guide units 185 to 188 is set to be higher than a height h1 of the guide rails 114 provided in the guide units 181 to 184 (see FIGS. 11A and 11B) in consideration of a difference in the installation heights of the first and second elastic members 140 and 150.

Therefore, an amount of displacement d of the first elastic member 140 generated to hold the weights 130 (see FIG. 11A) is equal to an amount of displacement d of the second elastic member 150 generated to hold the weights 130 (see FIG. 11B). However, the holding forces of the first and second elastic members 140 and 150 do not always have to be the same, and can be arbitrarily changed depending on a magnitude of impact to be detected if necessary. To change the holding forces, for example, the shape or thickness of the first and second elastic members 140 and 150 can be changed, the dimension of the circular hole or the long hole formed on the first and second elastic members 140 and 150 can be changed, the thickness of the first and second spacers 160 and 170 can be changed, or the height of the guide rails 114 and 115 can be changed.

The mounting base portion 141 is mounted on the center base portion 112 via the first spacer 160, and the first elastic member 140 holds the weights 130 by a predetermined force that is set in advance by causing the projecting portions 142 to be deformed by a predetermined amount. Similarly, the mounting base portion 151 is mounted on the center base portion 112 via the second spacer 170, the first elastic member 140, and the first spacer 160, and the second elastic member 150 holds the weights 130 by a predetermined force that is set in advance by causing the projecting portions 152 to be deformed by a predetermined amount.

When the weight 130 comes out from the first elastic member 140 onto the pair of the erect portions 113, the corresponding projecting portion 142 of the first elastic member 140 restores to planar state, i.e., to be flush with the mounting base portion 141. When the projecting portion restores to the planar state, the adjacent projecting portions 142 decrease in holding force, and thus the weights 130 may come out from the holding holes 145 formed on the adjacent projecting portions 142 even if the weights are subjected to a lower magnitude of impact than a threshold. To cope with such an event, a position controlling unit 113a is provided on each of the erect portions 113 to maintain deformation of the projecting portion 142. Such a position controlling unit is similarly provided on each of the erect portions 113 to maintain deformation of the projecting portion 152. Subsequently, how the weights 130 are held by the first and second elastic members 140 and 150 is explained below. In the example shown in FIGS. 11A and 11B, the weights 130 deform the projecting portions 142 and 152 of the first and second elastic members 140 and 150 having the predetermined thickness t by the predetermined amount of displacement d, and are held by the circular hole portions 143 and 153 (having the diameter D1) of the holding holes and 155. In the present invention, the weights 130 are held in the circular hole portions 143 and 153 formed on the first and second elastic members 140 and 150. If any of the weights 130 comes out from any of the first and second elastic members 140 and 150 by the application of a magnitude of impact larger than the threshold, a portion of the bottom plate 116 painted in red where the moved weight 130 is initially placed can be seen through the corresponding one of the circular hole portions 143 and 153. Therefore, it is possible to identify a direction of the impact. In addition, if multiple impacts in different directions are applied, it is also possible to identify the directions of the impacts.

In this manner, in the impact detection sensor 100 according to the fourth embodiment, when the weight 130 located in a direction of an applied impact comes out from any of the first and second elastic members 140 and 150, a portion of the bottom plate 116 painted in red where the moved weight 130 is initially placed can be seen through the transparent eight-headed arrow portion 122 of the cover member 120. Therefore, it is possible to identify a direction of the impact. Thus, with one impact detection sensor, it is possible to detect an impact in any direction.

Figure 13:
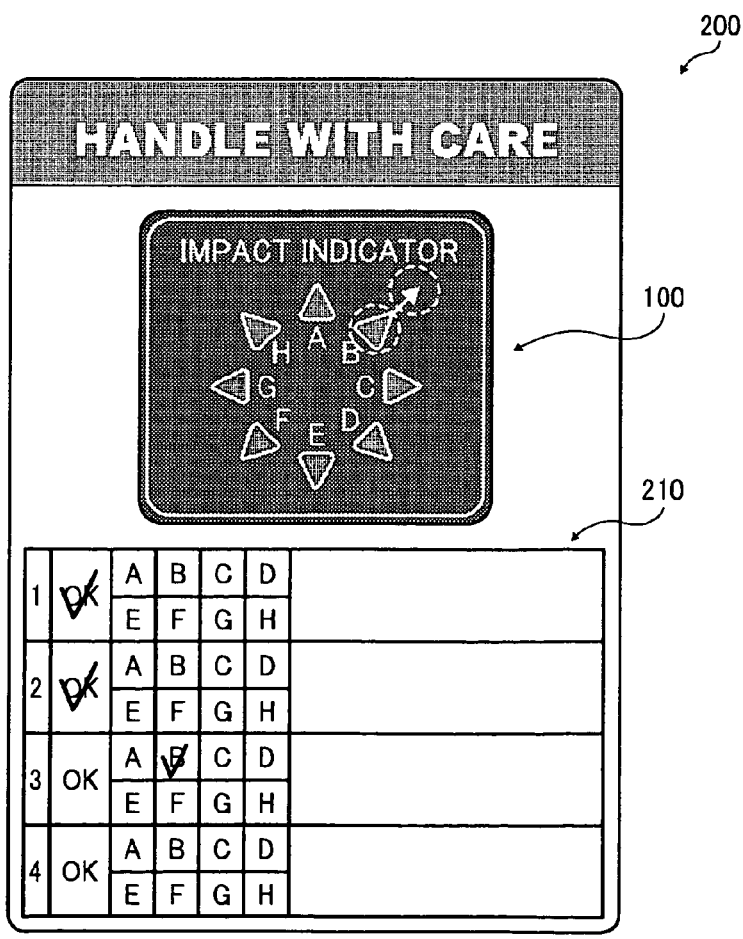
FIG. 13 is a schematic diagram of an impact detection system according to a fifth embodiment of the present invention.

Subsequently, an impact detection system 200 according to a fifth embodiment of the present invention is explained below with reference to FIG. 13. FIG. 13 is a schematic diagram of the impact detection system 200. The impact detection system 200 includes the impact detection sensor 100 according to the fourth embodiment and a progress note area 210. On the progress note area 210, for example, a code and a number are written. In the impact detection sensor 100 shown in FIG. 13, alphabets A to H are assigned to transparent triangular arrows pointing to the up, upper right, right, lower right, down, lower left, left, and upper left in this order. Each time a checker checks whether the impact detection sensor 100 has detected any impact in each of stages, he/she writes a check result on the progress note area 210. When the impact detection sensor 100 has detected an impact, the checker ticks a corresponding alphabet in the field of the corresponding stage on the progress note area 210. When the impact detection sensor 100 has detected no impact, the checker ticks "OK" in the field of the corresponding stage on the progress note area 210. In this example, the progress note area 210 shows that the impact detection sensor 100 has not detected any impact at points 1 and 2, but the impact detection sensor 100 has detected an impact in a direction B, i.e., the upper right direction at point 3. In this manner, the impact detection system 200 includes the area where the check can record whether the impact detection sensor 100 has detected any impact, which direction the detected impact is in, and which stage the impact is detected on a distribution route. In other words, the impact detection system 200 can indicate an impact history.

Figures 14, 15:
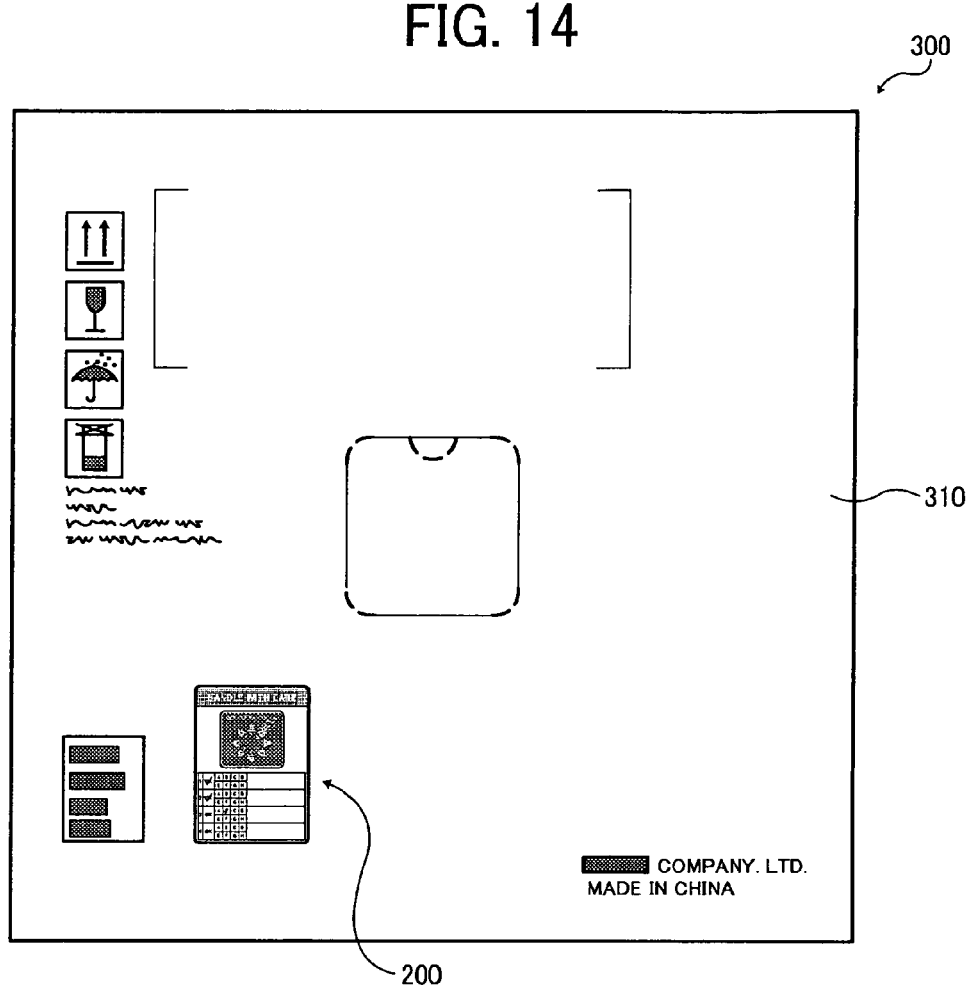
FIG. 14 is a schematic diagram of a packaging container to which the impact detection sensor shown in FIG. 13 is attached.
FIG. 15 is a table of specifications of a packaging container used in a drop test.
Figure 19A:
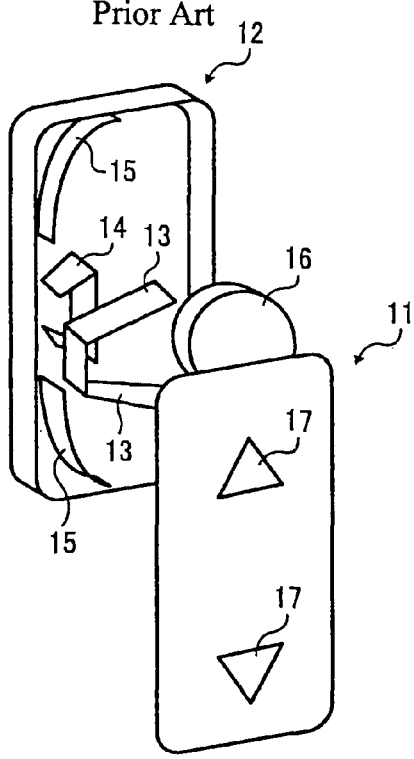
FIG. 19A is an exploded perspective view of a conventional impact detection sensor.
Figure 19B:
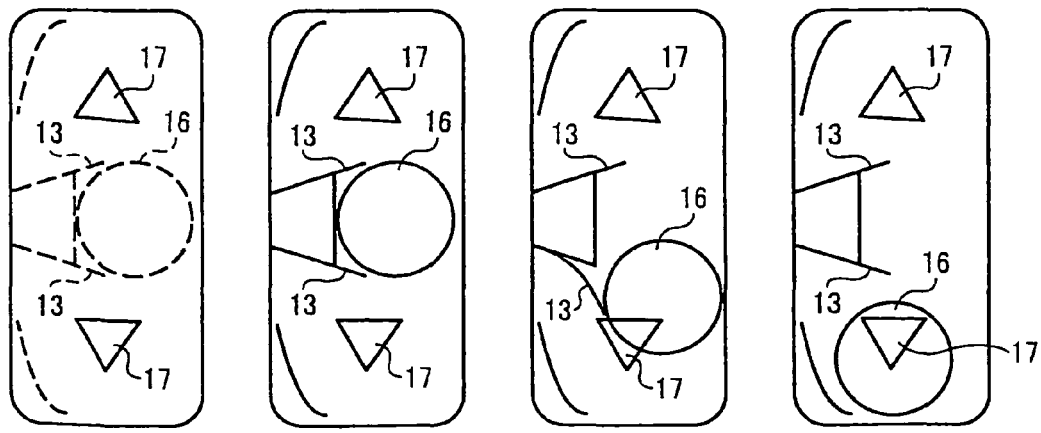
FIG. 19B is front views illustrating movement of a weight in the conventional impact detection sensor shown in FIG. 19A.

FIG. 14 is a schematic diagram of a packaging container 300 to which the impact detection system 200 is attached. The impact detection system 200 is attached to a vertically-longitudinal side surface 310 of the packaging container 300. In this example, the impact detection system 200 is arranged near a bar code label not to affect the design of the packaging container 300 and so as to be easy to standardize a position of the impact detection system 200 in any packaging containers depending on models of products. A bar code on the bar code label is scanned to inspect the packaging container 300 each time the packaging container 300 is loaded and unloaded from when the packaging container 300 is shipped from the factory till when the packaging container 300 is delivered to a shop or a store via a warehouse. Therefore, by arranging the impact detection system 200 near the bar code label, the impact detection system 200 can be checked in conjunction with the inspection of the packaging container 300.

The inventor conducted a drop test on a packaging container shown in FIG. 15 to check a change in conditions of the elastic member depending on impacts to be detected, i.e., a relation among an amount of displacement d of the projecting portion, the thickness t of the elastic member, and the presence or absence of the holding holes.

An impact detection sensor used in the drop test was the one including four weights and one elastic member. The weights were put on guide units extending in the upper, lower, right, and left directions, respectively. The elastic member is attached to a center base portion of a casing via a spacer. A diameter D of the weights was 8 millimeter (mm). A diameter D1 of circular holes formed on the elastic member was 7 mm.

The test was conducted in conformity with the following standards:

Packaged freights-Conditioning for testing (JIS Z 0203: 2000);

Standard Test Methods for Programmable Horizontal Impact Tests for Shipping Containers and Systems (ASTM D 4003: 92);

Packaged freights-General rules of testing (JIS Z 0200: 1999);

Methods of Designating on Component Parts and Points of Containers when Testing (JIS Z 0201: 1989);

Method of drop test for packaged freights (JIS Z 0202: 1994); and

ISTA PACKAGE PROJECT-1 PRE-SHIPMENT TEST PROCEDURES (REVISED JANUARY 1984).

The test was conducted with a drop impact test apparatus as follows:

Functional Overview of the Apparatus:

A test specimen is put on a table subjected to an impact. The movement of the table is controlled by a hoist mounted on an upper strut of the table. The position of the table is set by an electronically-controlled nitrogen-gas hydraulic brake system. The table is free-fall dropped by release of the brake to run into a programmer unit. An impact waveform and a response waveform can be monitored with a waveform analysis software "Test Partner" installed on the drop impact test apparatus.

Application of the Apparatus:

Test for drop impact strength of packaged freight and transportation simulation test;

Standard test of JIS Z 0119 standard, ASTM-D3332 standard, and the like;

In-Transit Transshipment/Handling Simulation Test;

Test for drop impact strength of product (damage boundary) and transportation simulation test;

Transportation test of non-packaged recalled product; and the like.

The drop impact test apparatus, Model 122, is used for testing a large product and a large-size unit. The drop impact test apparatus, Model 65/81, is used for testing a small product and a small-size unit.

Basic Specifications of the Apparatus:

Manufacturer: Lansmont Corp. (USA)

Model: Model 122 (for large size)

Dimension of table: 1,220 mm×1,220 mm

Maximum loading weight: 455 kilograms (kg)

Impact waveform (maximum acceleration): half sine wave ($5.9 \text{ km/s}^2$), trapezoidal wave ($1.5 \text{ km/s}^2$)

Maximum velocity change: 7.6 m/s

Waveform generator: high-pressure nitrogen gas programmer (150 bar)

Waveform analysis software: Test Partner

Results of each of the drop tests conducted under different conditions are explained below. First, the drop test was conducted under three different conditions of an amount of displacement d of the elastic member of 0.15 mm in thickness. The amounts of displacement d were set to 0.6 mm, 0.25 mm, and 0.05 mm. FIG. 16 is a table depicting a result of the drop test, i.e., whether an impact was detected with respect to each of the amounts of displacement d, in which an open circle means that an impact was detected and a cross means that an impact was not detected. When the amount of displacement d was 0.05 mm, an impact was detected when the test specimen was dropped from a height of 35 centimeters (cm) or more (i.e., a drop velocity of 2.6 meters per second (m/s) or more). When the amount of displacement d was 0.25 mm, an impact was detected when the test specimen was dropped from a height of 45 cm or more (i.e., a drop velocity of 3.0 m/s or more). When the amount of displacement d was 0.6 mm, an impact was detected when the test specimen was dropped from a height of 60 cm or more (i.e., a drop velocity of 3.4 m/s or more). The result of the drop test shows that a magnitude of impact to be detected can be adjusted by adjusting an amount of displacement d of the elastic member.

Next, the drop test was conducted under three different conditions of the thickness t of the elastic member. The thicknesses t was set to 0.15 mm, 0.20 mm, and 0.25 mm. In addition, in this drop test, the amount of displacement d was set to 0. FIG. 17 is a table depicting a result of the drop test, i.e., whether an impact was detected with respect to each of the thicknesses t, in which an open circle means that an impact was detected and a cross means that an impact was not detected. When the thickness t was 0.15 mm, an impact was detected when the test specimen was dropped from a height of 20 cm or more (i.e., a drop velocity of 2.0 m/s or more). When the thickness t was 0.20 mm, an impact was detected when the test specimen was dropped from a height of 35 cm or more (i.e., a drop velocity of 2.6 m/s or more). When the thickness t was 0.25 mm, an impact was detected when the test specimen was dropped from a height of 50 cm or more (i.e., a drop velocity of 3.1 m/s or more). The result of the drop test shows that a magnitude of impact to be detected can be adjusted by adjusting the thickness t of the elastic member.

Then, the drop test was conducted under two different conditions of whether the weights were held in the circular holes formed on the elastic member (according to the present invention) or on a surface of the elastic member (according to the conventional technologies as disclosed in Japanese Patent Application Laid-open No. 2003-207515 and Utility Model Application Laid-open No. H04-34614) to examine whether there is any change in accuracy of impact detection depending on these conditions. In this test, the elastic member of 0.15 mm in thickness was used, and the amount of displacement d of the elastic member was set to 0.25 mm. The detection reaction sensitivity was checked under two different conditions, one is that the test specimen was dropped from a height of 50 cm (at a drop velocity of 3.1 m/s), and the other is that the test specimen was dropped from a height of 25 cm (at a drop velocity of 2.2 m/s). FIG. 18 is a table depicting a result of the drop test, i.e., whether the impact detection sensor indicates that any of the weights is moved by being subjected to an impact depending on whether the weights are held in the circular holes formed on the elastic member or on the surface of the elastic member, in which an open circle means that an impact was detected, a cross means that an impact was not detected, and a dash means that test was skipped because the impact was already detected within the smaller margin of error. In a case where the weights were held in the circular holes, when the test specimen was dropped from the height of 50 cm (i.e., the drop velocity of 3.1 m/s), an impact was detected within a margin of error of 2.5 cm; and when the test specimen was dropped from the height of 25 cm (i.e., the drop velocity of 2.2 m/s), an impact was detected within a margin of error of 1.5 cm. On the other hand, in a case where the weights were held on the surface of the elastic member, when the test specimen was dropped from the height of 50 cm (i.e., the drop velocity of 3.1 m/s), an impact was detected within a margin of error of 8.0 cm; and when the test specimen was dropped from the height of 25 cm (at the drop velocity of 2.2 m/s), an impact was detected within a margin of error of 5.0 cm. In other words, the results of the margin of error in both cases where the test specimen was dropped from the height of 50 cm (at the drop velocity of 3.1 m/s) and the height of 25 cm (at the drop velocity of 2.2 m/s) when the weights were held on the surface of the elastic member were inferior to those when the weights were held in the circular holes. The drop test found that an impact can be detected with high sensitivity by holding the weights in the circular holes. When the weights are held in the circular holes, the weights have point contact or line contact with the elastic member. Therefore, when the weights are held on the surface of the elastic member, areas of the weights having contact with the elastic member are larger than those are when the weights are held in the circular holes. Thus, it can be considered that the weight comes out from the elastic member in a shorter time when the weights are held in the circular holes than that is when the weights are held on the surface of the elastic member.

According to an aspect of the present invention, a single impact detecting apparatus can detect, as a cause of quality loss of goods, multiple impacts in different directions that a packaging in transit is subjected thereto, for example, when the packaging is dropped down in a vertical direction or fallen on its side by external forces under various conditions of distribution, and also can record thereon a history of the impacts.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An impact detecting apparatus comprising:
an indicator unit capable of indicating different directions of multiple impacts when the impact detecting apparatus is subjected to the multiple impacts;
a weight;
a guide unit that guides the weight to move in a direction of an impact when the impact detecting apparatus is subjected to the impact; and
an elastic member that elastically holds the weight between the elastic member and the guide unit by applying a bias to the weight to restrict movement of the weight before the impact detecting apparatus is subjected to the impact, wherein
when the impact detecting apparatus is subjected to the multiple impacts in different directions, the indicator unit is capable of indicating the different directions and the weight is released from the elastic member and moves on the guide unit to a position of the indicator unit, thereby indicating the direction of impact.

2. The impact detecting apparatus according to claim 1, further comprising a holding hole on a peripheral portion of the elastic member, wherein
the elastic member restricts the movement of the weight by holding the weight in the holding hole.

3. The impact detecting apparatus according 1, wherein
a tip portion of the elastic member has a wedge shape, and the tip portion serves to restrict the movement of the weight before the impact detecting apparatus is subjected to the impact, and also serves to prevent the weight moved due to the impact from moving back to a position where the weight is originally located after the weight moves when the impact detecting apparatus is subjected to the impact.

4. The impact detecting apparatus according to claim 1, wherein
the weight, the guide unit, and the elastic member are configured as one unit, and
a plurality of units are arranged in layers so as to indicate number of times and directions of impacts.

5. A packaging system comprising:
a packaging container for packing therein an object to be packaged, the packaging container having at least one surface; and
the impact detecting apparatus according to claim 1 attached to the surface of the packaging container.

6. The packaging system according to claim 5, wherein the surface is a side wall surface of the packaging container.

7. An impact detecting apparatus comprising:
an indicator unit capable of indicating different directions of multiple impacts when the impact detecting apparatus is subjected to the multiple impacts;
a plurality of weights that are arranged to correspond to the different directions to be detected;
a guide unit, including a plurality of guide members that are arranged radially from a center base portion along the different directions of the multiple impacts to be detected, and guide the weights to move thereon respectively; and
an elastic member that is made of an elastic thin sheet, and includes
a mounting base portion that is mounted to the center base portion; and
projecting portions that project from the mounting base portion in a substantially radial manner along the guide members, the projecting portions elastically holding the weights between tips of which and the guide members thereby keeping the weights in normal positions near the center base portion of the guide members, and elastically bending, when the impact detecting apparatus is subjected to an impact in a certain direction, thereby causing any of the weights located in the direction of the impact to move because the weight is released from the projecting portion, wherein
when the impact detecting apparatus is subjected to the multiple impacts in different directions, the indicator unit is capable of indicating the different directions,
the indicator unit is mounted over the guide members so that any movements of the weights from the normal positions on the guide members can be seen from outside through the indicator unit, and
the different directions of the multiple impacts to be detected are grouped into plural pairs, the weights, the guide members, and the elastic member are configured as units by each of the pairs, and the units are arranged in layers.

8. The impact detecting apparatus according to claim 7, wherein
the weights have a spherical shape,
a circular holding hole for holding the weight therein is formed on each of the projecting portions, and
the projecting portions respectively hold corresponding weight by having line contact with the weight on a circumference of the holding hole.

9. The impact detecting apparatus according to claim 7, wherein
the guide units have a two-layer structure,
each of the guide members is composed of a high guide unit and a low guide unit, the high guide unit and the low guide unit having a height difference,
the elastic member includes a first elastic member and a second elastic member, the first elastic member being attached to the center base portion, the second elastic member being attached to the center base portion via the first elastic member, and
a spacer having a thickness corresponding to the height difference between the high guide unit and the low guide unit is provided between the first elastic member and the second elastic member.

10. The impact detecting apparatus according to claim 9, wherein each of the first elastic member and the second elastic member is provided with a predetermined elastic force by the spacer to adjust elastic forces of the first elastic member and the second elastic member depending on a layer thereof.

11. The impact detecting apparatus according to claim 9, wherein
a predetermined elastic force is applied to the first elastic member by the spacer, and
the second elastic member is mounted to a convex portion provided on a rear surface of a cover of the impact detecting apparatus, and is pressed by the convex portion, and thereby being provided with the predetermined elastic force.

12. The impact detecting apparatus according to claim 7, further comprising supporting portions that are arranged to be opposed to the projecting portions with keeping a predetermined distance from corresponding projecting portion in a bias direction of the corresponding projecting portion, and when any of the weights is released from corresponding projecting portion, the corresponding projecting portion comes in contact with corresponding supporting portion.

* * * * *